(12) United States Patent
Burch et al.

(10) Patent No.: US 8,325,767 B2
(45) Date of Patent: Dec. 4, 2012

(54) ENHANCEMENT OF IEEE 1588 SYNCHRONIZATION USING OUT-OF-BAND COMMUNICATION PATH

(75) Inventors: Jefferson B. Burch, Palo Alto, CA (US); Daniel Lee Pleasant, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1379 days.

(21) Appl. No.: 11/529,852

(22) Filed: Sep. 29, 2006

(65) Prior Publication Data

US 2008/0080562 A1 Apr. 3, 2008

(51) Int. Cl.
*H04J 1/14* (2006.01)
*H04N 17/00* (2006.01)

(52) U.S. Cl. .......... 370/503; 370/496; 348/194

(58) Field of Classification Search ............ 370/350, 370/304, 324, 395.62, 503–520, 347, 356, 370/394, 398, 428, 429, 463, 496; 709/238, 709/248, 201, 203, 208–211, 220–222, 230–231; 710/313–317, 38; 348/180, 194
See application file for complete search history.

(56) References Cited

U.S. PATENT DOCUMENTS

| | | | | |
|---|---|---|---|---|
| 5,251,210 A * | 10/1993 | Mann et al. | | 370/519 |
| 5,313,620 A | 5/1994 | Cohen et al. | | |
| 5,566,180 A * | 10/1996 | Eidson et al. | | 370/473 |
| 5,958,060 A * | 9/1999 | Premerlani | | 713/400 |
| 6,173,207 B1 * | 1/2001 | Eidson | | 700/14 |
| 6,205,362 B1 * | 3/2001 | Eidson | | 700/4 |
| 6,370,159 B1 * | 4/2002 | Eidson | | 370/503 |
| 6,512,990 B1 * | 1/2003 | Woods et al. | | 702/125 |
| 6,654,316 B1 * | 11/2003 | Butler et al. | | 367/157 |
| 6,654,356 B1 * | 11/2003 | Eidson et al. | | 370/303 |
| 6,741,952 B2 * | 5/2004 | Eidson | | 702/187 |
| 7,190,704 B2 * | 3/2007 | Rabenko et al. | | 370/508 |
| 7,251,199 B2 * | 7/2007 | Eidson | | 368/46 |
| 7,254,115 B1 * | 8/2007 | Lakhanpal et al. | | 370/257 |
| 7,519,081 B2 * | 4/2009 | Sorenson et al. | | 370/468 |
| 2002/0057717 A1 * | 5/2002 | Mallory | | 370/503 |
| 2002/0111696 A1 | 8/2002 | Albrecht et al. | | |
| 2003/0117899 A1 * | 6/2003 | Eidson | | 368/46 |
| 2004/0141526 A1 * | 7/2004 | Balasubramanian et al. | | 370/503 |
| 2004/0177162 A1 * | 9/2004 | Wetzel et al. | | 709/248 |
| 2004/0218532 A1 * | 11/2004 | Khirman | | 370/235 |
| 2005/0207387 A1 * | 9/2005 | Middleton et al. | | 370/347 |
| 2006/0013262 A1 * | 1/2006 | Downey et al. | | 370/503 |
| 2006/0136570 A1 * | 6/2006 | Pandya | | 709/217 |
| 2006/0155820 A1 | 7/2006 | Umlauf et al. | | |
| 2006/0245454 A1 * | 11/2006 | Balasubramanian et al. | | 370/509 |
| 2006/0251084 A1 * | 11/2006 | Elliot | | 370/398 |
| 2006/0256820 A1 * | 11/2006 | Ilnicki et al. | | 370/503 |
| 2006/0280182 A1 * | 12/2006 | Williams et al. | | 370/394 |
| 2007/0147562 A1 * | 6/2007 | Eidson | | 375/354 |

FOREIGN PATENT DOCUMENTS

| | | |
|---|---|---|
| DE | 10059270 | 6/2002 |
| DE | 10246732 | 4/2004 |
| WO | 0249275 | 6/2002 |
| WO | 2005076507 | 8/2005 |

* cited by examiner

*Primary Examiner* — Hoon J Chung
*Assistant Examiner* — Prince A Mensah

(57) ABSTRACT

A system includes at least two IEEE 1588 nodes. The nodes are connected by two paths: a low latency communication path and a high bandwidth path. The clocks within the nodes are synchronized to one another at a network interface. Data and timing are transmitted on the high bandwidth path while critical timing signals are passed on the low latency communication path thereby improving timing synchronization.

19 Claims, 4 Drawing Sheets

ENHANCEMENT OF IEEE 1588 SYNCHRONIZATION USING OUT-OF-BAND COMMUNICATION PATH

BACKGROUND

To accommodate the IEEE 1588 standard for the Precision Time Protocol (PTP), it is convenient to monitor the Media Independent Interface (MII) for 10 and 100 BASE-T interfaces. The digital signals are interpreted to indicate a marker point, e.g. timestamp, for the departure and arrival of the Ethernet Frames, as they pass from the Media Access Layer (MAC) to the Physical Layer (PHY).

For 1000 BASE-T interfaces, the equivalent interface is the Gigabit Media Independent Interface (GMII). The trend in silicon fabrication is to integrate the MAC and PHY functions into the same device. This has created a difficulty for 1588 implementers who want to monitor these signals in a 1000 BASE-T environment since the GMII interface is not exposed.

Timing inaccuracies are introduced by the delays, delay asymmetries, and jitter from the following network related sources: PHYs, cables, and network devices, e.g. routers, switches, boundary clocks, and transparent clocks.

SUMMARY

A system includes at least two IEEE 1588 nodes. The nodes are connected by two paths: a low latency communication path and a high bandwidth path, e.g. Ethernet. The clocks within the nodes are synchronized to one another at a network interface. Data and timing are transmitted on the high bandwidth path while critical timing signals are passed on the low latency communication path thereby improving timing synchronization.

The high bandwidth path is selected from a group including Ethernet and PCI Express. The low-latency communication path is selected from a group includes a trigger wire, coaxial cable, LXI-Trigger Bus, RF signal, optical signal, optical signal in a fiber, trace on a back-plane, signal on a ground plane, and signal on a power supply bus.

DETAILED DESCRIPTION

The inventive concept to improve synchronization is for both ends of a communication path generate a timestamp for a common event. These timestamps that the master device collects must be transmitted to the slave device for additional processing. As an illustrative example, the concept will be described in the following figures using IEEE-1588 SYNC and DELAY_REQ packets.

Figure 1:
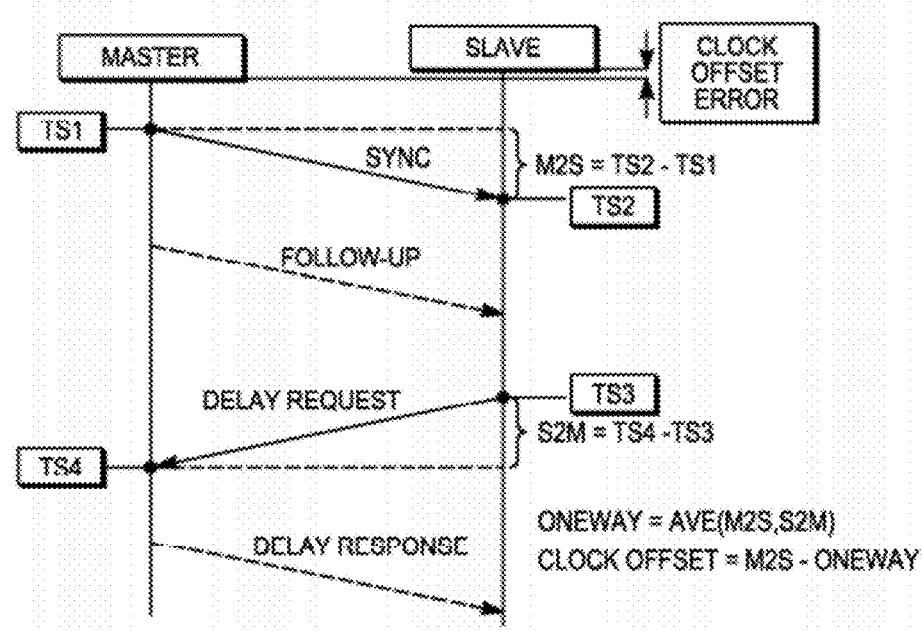
FIG. 1 illustrates the basic IEEE-1588 operation with the master device issuing SYNC packets where timestamps TS1 and TS2 are collected (prior art).

FIG. 1 illustrates the basic IEEE-1588 operation with the master device issuing SYNC packets where timestamps TS1 and TS2 are collected. The slave device issues DELAY_REQ packets where timestamps TS3 and TS4 are collected. The IEEE-1588 standard may be found at the http://ieee1588.nist.gov website.

Figure 2:
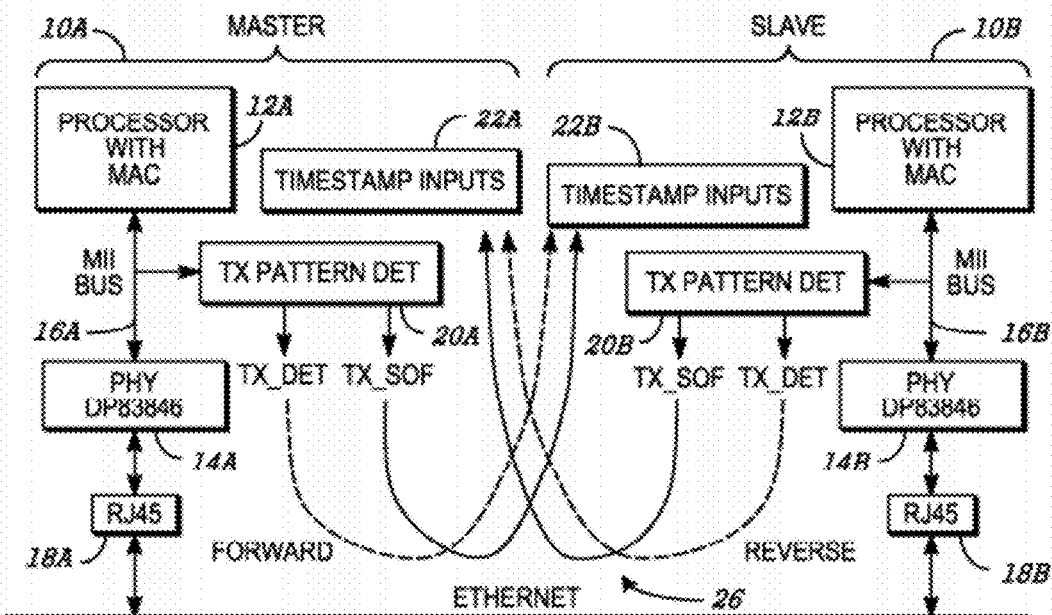
FIG. 2 illustrates an embodiment of the invention.

FIG. 2 illustrates an embodiment of the invention. Both the master and slave devices 10A, 10B are bidirectionally connected by the normal network path 24, e.g. Ethernet, as well as the out-of-band communication path or low latency communication path 26.

Each device includes a processor with Media Access Control (MAC) 12A, 12B. The MAC 12A, 12B is bidirectionally communicates with the physical layer (PHY) 14A, 14B using a MII Bus 16A, 16B. The PHY 14A, 14B bidirectionally communicates with a connector, e.g. RJ45 18A, 18B. A transmit pattern detector 20A, 20B generates transmit detect (TX_DET) and transmit start-of-frame (TX_SOF) signals by monitoring the MII Bus 16. A timestamp input circuit 22A, 22B is further included.

In one embodiment, FPGA signals that exist in the current implementation are routed to the low-latency/low jitter communication path. This simplifies the design and allows the system to degrade back to standard IEEE-1588 communications when the low-latency/low-jitter communication path is unavailable.

In operation, the "forward" path (shown as a solid line) carries the SYNC signal (the TX_SOF signal of the master device) from the master device to the slave device. The timestamp of input circuit of the slave device is used to capture the time-of-arrival of this trigger. This timestamp is an alternate to timestamp TS2 (SYNC receive time).

The "reverse" path (shown as a solid line) carries the DELAY_REQ signal (the TX_SOF signal of the slave device) from the slave device to the master device. Similarly, the timestamp of the input circuit of the master device is used to capture the time-of-arrival of this trigger. This timestamp is an alternative to timestamp TS4 (DELAY_REQ receive time).

As the same signal is used on the sending side as in standard IEEE-1588 communication, the timestamp TS1 (SYNC send time) and timestamp TS3 (DELAY_REQ send time) can be used without any additional processing.

Thus, the PHY delay has been calibrated and the MII time-stamp has been adjusted accordingly. For TX packets, the time-stamp is always later to account for the PHY delay in the outbound direction. The timestamp reported in the FOLLOW_UP packet is only correct for slave devices that are time-stamping at their network interfaces. To further illustrate, when the PHY to the "out-of-band" connector delay is different from the FPGA to the "out-of-band" connector delay, the master device sends two FOLLOW_UP packets. One contains the PHY corrected time_stamp and the other contains the "out-of-band" corrected time-stamp. Alternatively, the two time-stamps may be in FOLLOW_UP message.

To address "false positives", the monitoring circuit of the device receiving the timestamp generates the TX_SOF (transmit start of frame) on any network traffic. Only later as the packet detector has processed the necessary header bytes does it generate the TX_DET (transmit detect) signal. The TX_SOF signal leads the TX_DET signal by numerous byte times. On 100-Base-T Ethernet Frame technology, this delay equals 36 μsec and corresponds to 45 bytes from the first byte of the packet (after the preamble) to the end of the IEEE-1588 version byte.

When the solid lined "forward" and "reverse" paths are used, the receiving end is triggered on each network packet transmitted by the remote end. As the packet also follows the network path, a second timestamp is normally collected as the RX detector operates (not shown). Comparing these two timestamps, the receiver software can reject such "false positives".

When the dashed lined "forward" and "reverse" paths are used, there are no "false positives" as the signal is generated only upon a valid pattern match by the sender. However, the signal is "late" by the same delay, e.g. 36 μsec for 100-Base-T Ethernet Frame technology, discussed above. The receiver needs to be configured to subtract out this constant value from the timestamp.

For SYNC packets, the slave device uses the timestamp resulting from the forward path rather than the timestamp from its RX detector. The master device requires no changes. The master device generates the same FOLLOW_UP packet as before (containing TS1).

For DELAY_REQ packets, the slave device behaves unaltered. When it sends the DELAY_REQ packet, its TX detector automatically generates the correct signal that traverses the "reverse" path back to the master device. The master device is configured to return the timestamp resulting, from the "reverse" path in the DELAY_RESP message.

Suitable low-latency paths include a trigger wire, coaxial cable, LXI-Trigger Bus, RF signal, optical signal, optical signal in a fiber, trace on a back-plane, signal on a ground plane, and signal on a power supply bus.

Figure 3:
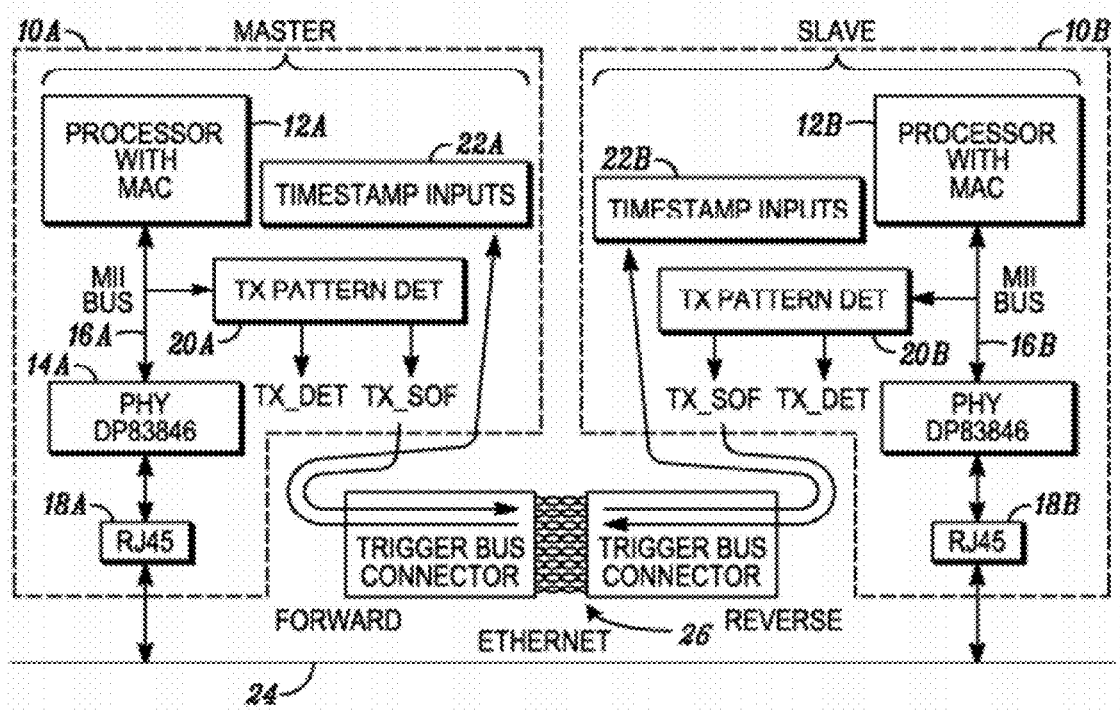
FIG. 3 illustrates a LXI Class A Trigger Bus used as the out-of-band communication path.

FIG. 3 illustrates a LXI Class A Trigger Bus used as the out-of-band communication path 26.

The LXI Trigger bus 26 has 8 low voltage differential signal (LVDS) pairs. The embodiment uses two of those pairs. One pair is used for SYNC "start-of-frame" signals in the "master->slave" direction. The other pair is used for reverse DELAY_REQ "start-of-frame" signals in the "slave->master" direction.

To accommodate "false positives", since the network packet arrives later over the Ethernet path, one approach is to associate the two timestamps. Thus, any timestamps resulting from non-IEEE-1588 event packets are discarded.

In LXI Class A, the trigger bus 26 extends from device-to-device in a daisy chain fashion. To not run out of trigger lines in the reverse direction, the trigger line is time-shared. All slave devices connected to the same daisy chain are configured to send delay requests so that they are spaced out in time. During idle periods, they would tri-state that trigger line, e.g. wired or mode.

As each slave device 10B sends their DELAY_REQ, a pulse is automatically sent down the shared trigger line. The hardware on the slave side must: 1) automatically "untristate", 2) send the pulse, 3) delay for a few μsec, and 4) re-tristate. The master device would see the edge and timestamp it. It is critical that the master device receive the DELAY_REQ packet over the network before the next timestamp comes down the trigger line. The DELAY_REQ signals from each slave must be sufficiently spaced apart in time such that the master device is not confused.

Alternatively, the master device 10A can participate in the time-share scheme. The scheduling of SYNC and DELAY_REQ messages must be spread out in time to avoid confusion. This is easily done as the Ethernet path may be used to achieve synchronization to better than 1 μsec so all devices have a coherent sense of time.

The inventive concept can be used to synchronize over the network similar to normal IEEE 1588 PTP while using the "out of band" path to calibrate out the IEEE1588 network path errors. To illustrate, the time-stamps from the "out-of-band" path may be used to measure end-to-end asymmetries. The network path for IEEE1588 is used when the test system is in operation thus freeing up all the trigger lines in the LXI trigger bus. At start-up and during calibration, the trigger lines can be switched into a mode such that the IEEE1588 SW measures all the delays, jitter, and asymmetries from the network path. Once calibrated, the LXI trigger bus lines are "released" for use for traditional test system triggering. Other configurations that have trigger lines, e.g. VXI or PXI, may operate similarly.

Figure 4:
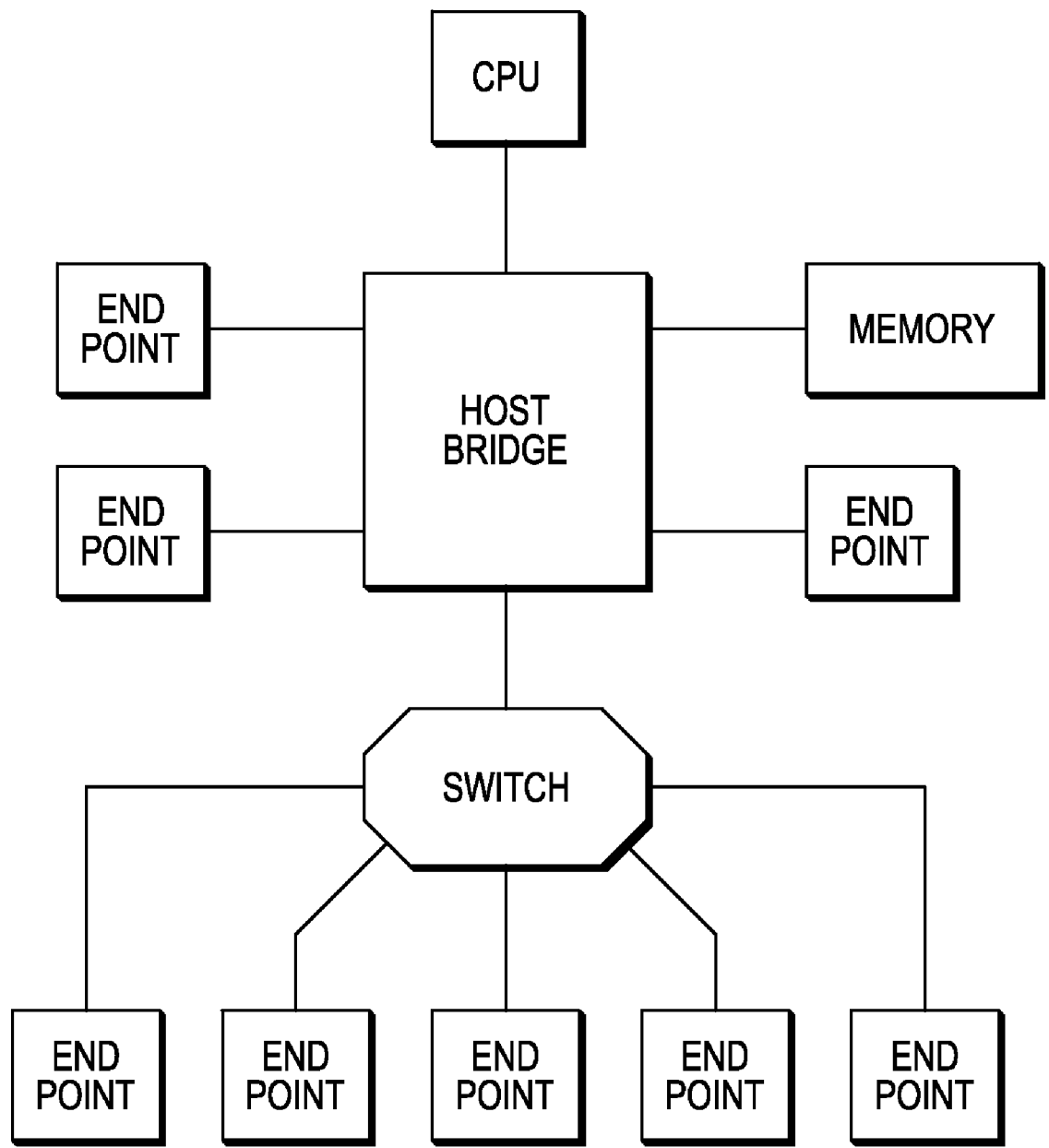
FIG. 4 illustrates PCI-Express architecture used as the out-of-band communication.

FIG. 4 illustrates PCI-Express architecture used as the out-of-band communication 26. In PCI-Express, the interconnection scheme between the devices mimics a computer network. At its core is the addition of a switch integrated circuit (IC) into the center of the PC architecture.

The "end point" devices and the host CPU must be synchronized with each other. For purposes of discussion, the "end point" devices are measurement instruments that need tight synchronization. The "switch" needs to be modified similar to an IEEE-1588 boundary clock.

Figure 5:
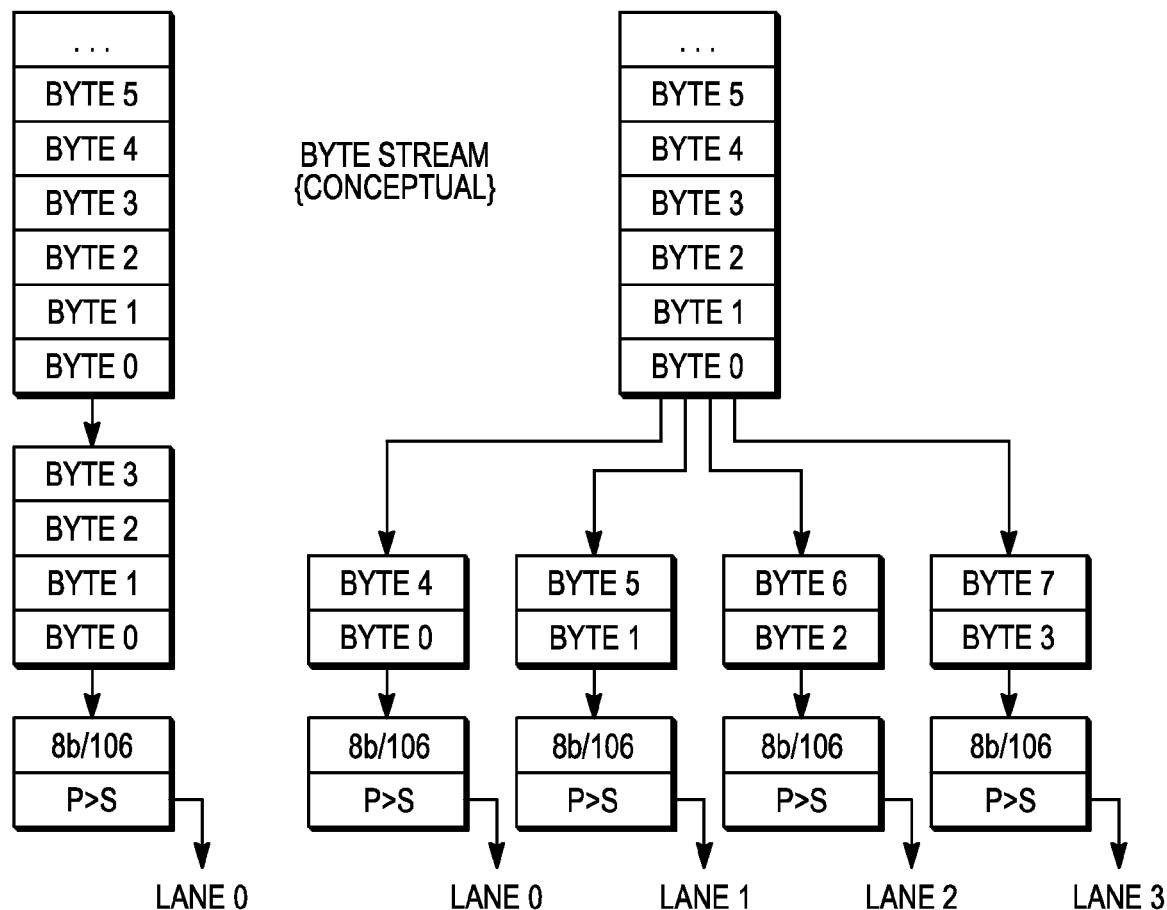
FIG. 5 illustrates the multiple-lane nature of PCI-Express.

To allow for synchronization, the "end points" and the "switch" must recognize the "start-of-frame" signals. The "multiple lane" nature of PCI Express is shown in FIG. 5.

A data packet, e.g. SYNC packet, gets divided into bytes that flow down different lanes. Inside the receiving device, these lines are re-assembled back into a packet. If timestamps are generated at that point, the delays and jitter introduced by the disassembly and the reassembly can be significant.

In the present invention, the byte stream directly inside the PCI Express interface application specific integrated circuit (ASIC) is monitored. Data rates are extremely fast, e.g. 400 psec bit times, 2.5 Gbps per lane. A packet recognizer is needed to collect timestamps for critical IEEE-1588-like synchronization packets. The equivalent of SYNC and DELAY_REQ packets must flow in both directions to allow for synchronization and removal of any-offset bias. Similar to standard IEEE-1588, the symmetry assumption is needed unless the system can be calibrated and asymmetries measured.

While the inventive concept has been described using IEEE-1588 SYNC and DELAY_REQ packets, improved timing synchronization may be achieved by the master device sending a periodic signal e.g. 1 pulse/second as the "event" that the slave device time-stamps.

Alternatively, the "event" can come from a source, e.g. a remote television station, outside the system. Both the master and slave devices "see" the event and thereby timestamp the event. Appropriate messages are sent between the devices so that the slave can adjust its clock appropriately.

We claim:

1. A system comprising:
   at least two nodes, each node including a clock;
   a low latency communication path connecting the two nodes; and
   a high bandwidth path connecting the two nodes;
   at least a first of the two nodes having,
      a bus over which an event packet is transmitted to/from the high bandwidth path;
      a transmit pattern detector configured to monitor the bus for the event packet and transmit an event signal over the low latency communication path in response to detecting the event packet, the event signal corresponding to a time of transmission of the event packet; and
      a timestamp input circuit configured to capture the time of arrival of the event signal received over the low latency communication path; and
   at least one of the nodes having a processor configured to synchronize the clocks of the nodes using the times of transmission of the event signal, the time of arrival of the event signals, and a message-based time synchronization protocol.

2. The system, as defined in claim 1, wherein the high bandwidth path is selected from a group including Ethernet and PCI Express.

3. The system, as defined in claim 2, wherein the low-latency communication path is selected from a group that includes a trigger wire, coaxial cable, LXI-Trigger Bus, RF signal, optical signal, optical signal in a fiber, trace on a back-plane, signal on a ground plane, and signal on a power supply bus.

4. The system, as defined in claim 2, wherein the low-latency path is bi-directional.

5. The system, as defined in claim 2, wherein:
the clocks of the nodes are synchronized to one another at a network interface;
the network interface is selected from a group including Media Independent Interface (MII) and Gigabit Media Independent Interface (GMII); and
a second of the two nodes comprises a second timestamp input circuit configured to timestamp receipt of the event signal corresponding to the time of transmission of the event packet.

6. The system, as defined in claim 5, wherein the first of the two nodes delays sending the event signal down the low-latency communication path by a fixed delay such that the event signal corresponds to the event packet.

7. The system, as defined in claim 5, wherein the first of the two nodes generates a time-stamp as the event signal enters the low-latency communication path.

8. The system, as defined in claim 5, wherein the event packet is a delay request packet, and the first of the two nodes accounts for delay when it receives a corresponding event packet from the second of the two nodes at the bus.

9. The system, as defined in claim 5, wherein the event packet is a synchronization packet, and the first of the two nodes corrects a timestamp of a "FOLLOW_UP" message prior to transmission.

10. The system, as defined in claim 5, wherein the low-latency path is a LXI Class-A trigger bus pair.

11. The system, as defined in claim 10, wherein:
the event signal corresponds to generating delay request packets; and
the event signal is transmitted down the low latency path as the event packet is transmitted down the high bandwidth path.

12. The system, as defined in claim 11, wherein the transmission of the event signal and event packet pairs are sent at widely spaced intervals to allow a same LXI Class-A trigger bus pair to be used for all delay request messages coming from all connected nodes.

13. The system, as defined in claim 11, wherein the at least two nodes arbitrate by random slot assignment over a large time window to minimize contention.

14. The system, as defined in claim 11, wherein the at least two nodes are configured to send delay request packets at specific times to minimize contention.

15. The system, as defined in claim 11, wherein the nodes send event signals and event messages at different times on pre-configured time slots.

16. A Calibration method comprising:
a first node transmitting an event packet on a high bandwidth path to a second node, each node includes a clock, the clocks being synchronized to one another at a network interface using message-based time synchronization protocol, wherein the high bandwidth path is used for operational synchronization;
one of the first and second nodes detecting the event packet at the network interface and generating an event signal corresponding to the time of detection of the event packet;
transmitting the event signal down a low-latency communication path connecting the first and second nodes, wherein the low-latency communication path is used for calibration synchronization;
timestamping the event signal by a receiving node of the first and second nodes, the receiving node receiving the event signal from the first and second nodes that detects the event packet;
and calibrating the clock of the receiving node according to one of the event packet and timestamp of the event signal.

17. The calibration method, as defined in claim 16, further comprising timestamping the event signal by the one of the first and second nodes.

18. The calibration method, as defined in claim 16, wherein the low-latency communication path is selected from a group that includes a trigger wire, coaxial cable, LXI-Trigger Bus, RF signal, optical signal, optical signal in a fiber, trace on a back-plane, signal on a ground plane, and signal on a power supply bus.

19. A method for synchronizing at least two nodes, each node including a clock and a network interface, the nodes being connected by a low latency communication path, and the network interfaces of the nodes being connected by a high bandwidth path, the method comprising:
synchronizing the clocks of the nodes to one another at the network interfaces using message-based time synchronization protocol, and
using the low latency communication path to calibrate out the network path errors when synchronizing the clocks wherein calibrating out the network path errors comprises:
the first node transmitting an event packet on the high bandwidth path to the second node;
the second node detecting the event packet at the network interface and generating an event signal corresponding to the time of detection of the event packet;
transmitting the event signal via the low-latency communication path;
timestamping the event signal by the first node; and
calibrating the clock of the first node according to the event packet and the time-stamp of the event signal.

* * * * *